Dec. 21, 1926.
J. J. HOFFMANN
1,611,446
SEMICOLLAPSIBLE MOLD FOR PRESSING WHOLE HAMS
Filed April 19, 1926  2 Sheets-Sheet 1
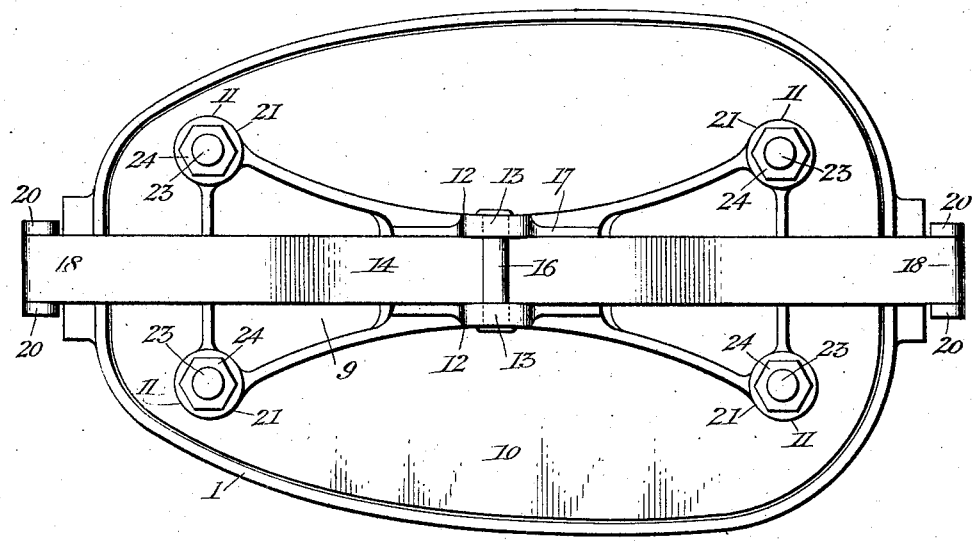
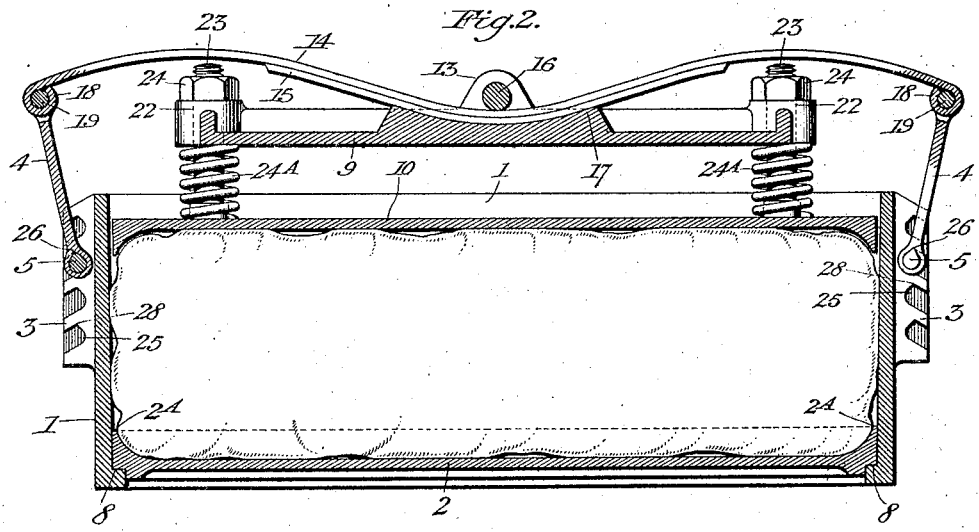
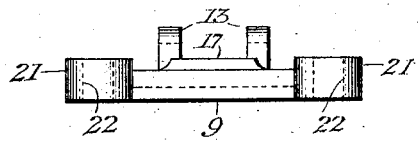
Inventor
Joseph J. Hoffmann
By H. S. Bailey Attorney.

Dec. 21, 1926.　　　　　　　　　　　　　　　　　　　1,611,446
J. J. HOFFMANN
SEMICOLLAPSIBLE MOLD FOR PRESSING WHOLE HAMS
Filed April 19, 1926　　　2 Sheets-Sheet 2
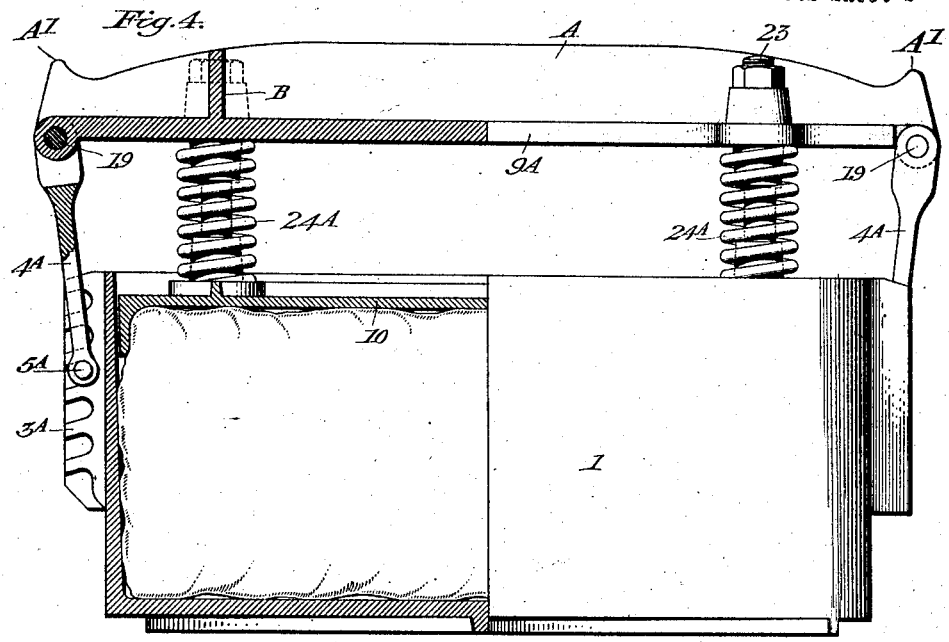
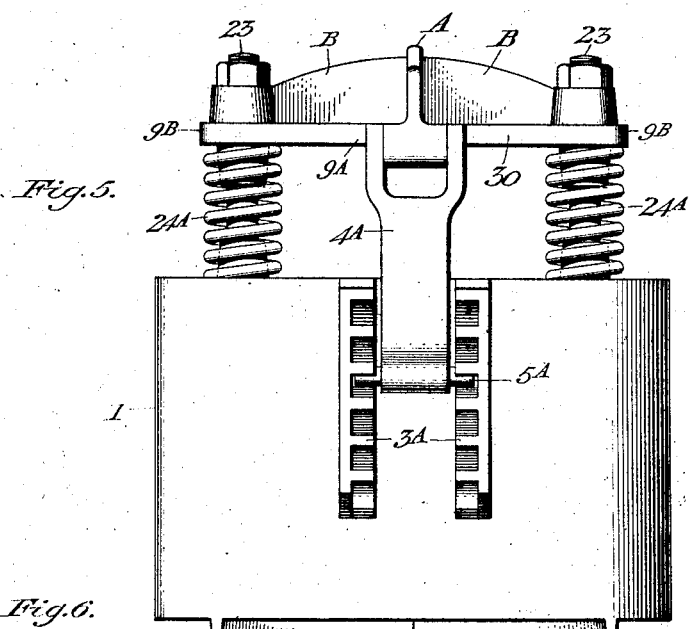
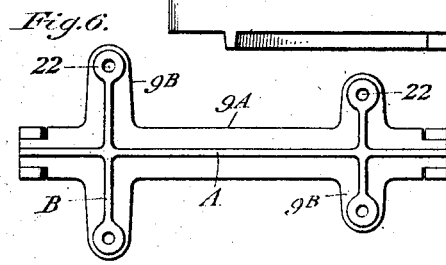
Inventor
Joseph J. Hoffmann
By H. S. Bailey   Attorney Patented Dec. 21, 1926.

1,611,446

UNITED STATES PATENT OFFICE.

JOSEPH J. HOFFMANN, OF DENVER, COLORADO.

SEMICOLLAPSIBLE MOLD FOR PRESSING WHOLE HAMS.

Application filed April 19, 1926. Serial No. 102,957.

My invention relates to a new semi-collapsible mold for pressing whole hams.

And the objects of my invention are:—

First: To provide a semi-collapsible type of a ham shaped mold that is especially adapted for pressing whole raw hams and also for cooking them in their pressing molds while they are under resilient pressure.

Second: To provide a mold for pressing whole raw hams and for holding them under a constant compression tension while they are being boiled and until they are satisfactorily cooked, and which is provided with assembling and removable parts that can be quickly assembled to receive and enclose a whole ham and that can be quickly removed from the mold after the ham is cooked.

Third: To provide a manually operating mold that is simple in construction and is of such weight that it can be quickly handled and that is inexpesive to make and by means of which hams can be satisfactorily pressed and cooked.

I attain these objects by the mechanism illustrated in the accompanying drawings, in which:—

Fig 1 is a plan view of a mold, especially designed and adapted to receive and press and cook whole hams.

Fig. 2 is a vertical section through Fig. 1.

Fig. 3 is an end view of the upper presser plate.

Fig. 4 is a view of the mold partly in section and partly in elevation showing a modification in the arrangement of the upper presser plate.

Fig. 5 is an end view of the mold showing a double row of reinforced pawl receiving teeth.

Fig. 6 is a plan view of the upper presser bar shown in Figures 4 and 5.

Similar letters of reference refer to similar parts throughout the several views.

I illustrate in Fig. 1 a plan view of a whole ham receiving and pressing mold that embodies my invention and in this view, the numeral 1 designates the body portion of the mold which is made preferably of oval shape to receive and fit around whole hams, laid in it on their sides and the sides of the mold are thin, and the mold is preferably cast out of aluminum, although it may be made out of any other suitable metal or material, and it is made tapering narrower from its top to its bottom which is preferably provided with a telescopic or a removable bottom 2, but if preferred it can be cast with an integral bottom member in it. And at its opposite ends, two vertical rows of projecting ratchet teeth 3, are cast; they are spaced far enough apart to receive between them a pawl lever 4, which is provided with a cross-bar pawl member 5, the opposite ends of which are shaped to form pawl members that are arranged and adapted to engage the teeth 3.

The removable bottom member 2 of my ham pressing mold has its opposite sides and ends 7 curved upwardly to edges 2A, that lay close to the sides and ends of the mold as shown in the section of the mold in Fig. 2.

The telescopic bottom member 2 of the mold is arranged to be inserted down through the top of the mold and rest on top of the shouldered step 8 formed in the bottom of the mold, and it is preferably made wide enough to fit close to the sides and ends of the mold, but loose enough to be very quickly pushed up out of the mold from its bottom side.

When pressing whole raw hams, I have found from experience, that it is best to apply a resilient pressure that will continue to exert its pressing force on the ham, while it is being cooked and consequently I employ two spring actuated pressure plates which I will designate, the upper pressure plate 9 and the lower pressure plate 10. The upper pressure plate 9 is made a litle narrow at its opposite ends, and rounded corners 11, but it is narrowed from its four corners 11, to its center portion 12, where it is provided with two upwardly projecting lugs 13, that are spaced far enough apart to receive two flat blade form of springs 14 and 15 between them, and a cross pin 16 which extends through the lugs cross-wise over the springs and holds them rigidly between them underneath the pin and down against a flat portion 17 on which they rest and which extends at an upward angle for a short distance on opposite sides of the pin 16.

The upper spring 14 curves upwardly from the center pin 16, and extends beyond the opposite ends of the mold and its terminal ends are provided with eyes 18 through which pins 19 extend and which also extend through lugs 20 that are formed on the upper ends of the pawl levers 4, which are preferably made wide enough to allow their lugs 20 to straddle the opposite eyed ends 18 of the spring 14.

The lower spring 15 is a reinforcement spring for the spring 14, and it extends along underneath the spring 14, from the pin 16 on its opposite sides for a portion of the length of the spring 14, and thus stiffens the spring 14.

At the four corners of the upper pressure plate 9, lugs 21 are formed through which apertures 22 are formed and the upper ends of posts 23 extend loosely up through apertures 22 in the presser plate 9, and on the end of each post, a nut 24 is threaded. These posts 23 are secured to a ham pressing plate 10 that is placed about two inches below the upper pressure plate 9 and this pressing plate 10 is a simple thin, flat, smooth cast aluminum plate, and it fits slidably within the top of the mold and rests on top of the ham when it is inserted in the top of the mold and it is held under a resiliently yielding pressure by coiled expansion springs 24$^A$ which are mounted on the four corner posts 23 and these coiled springs 24$^A$ are made stiff enough to require a good deal of manual pressure by the hands of the operator on the top pressure plate 9, to compress the four springs to the greater part of their length, and then lock the pawls of the top plate 9, to the teeth 3 at the opposite ends of the mold, by means of its levers 4, and the cross-bar pawls 5, after which the coiled springs 24$^A$ automatically and continuously exert a downward expansive pressure on the ham that results in its being continuously pressed all of the time until after it is cooked and the springs of the upper plate 9 are unlocked from the teeth 3, as the hams are cooked in the mold and the mold is not taken down until the mold is cool enough to be handled, then the two pressure plates are removed and then the pressed ham is removed and then the bottom plate is removed; the mold is then cleaned and ready to receive another raw ham.

The pawl and ratchet teeth mechanisms that are used on the opposite ends of the mold to lock the spring 14 to where it is pressed down, may be of any interlocking type; my invention however, in this particular, contemplates projecting teeth 3 on the opposite ends of the molds that are provided with triangular shaped recesses 25 in their outer sides and a triangular shaped pawl 5 on the opposite ends of the cross bar 4 arranged with the apexes 26 of their triangular shaped surfaces fitting into the apex 28 of the recesses 25 in the teeth 3, as this cooperating arrangement of the pawls and the teeth will prevent accidental unlocking of the pawls.

In Figures 4 and 5 I illustrate a modified arrangement of the top of the upper presser plate 9, which gives a firm and more rigid resistance to the downward pressure of the hands of an operator, than the springs 14 and 15 illustrated in Figures 1 and 2.

In this modification I employ a solid unyielding bar 9$^A$ extending across the top of the upper pressure plate and carrying pawl levers 4$^A$ at its opposite ends, the lower ends of which are provided with pins 5$^A$, which engage double rows of teeth 3$^A$, on the ends of the mold.

The bar 9$^A$ may be of the same shape as the bar 9 in Fig. 1, but I preferably make it in the shape shown in Fig. 6, which comprises a longitudinal bar having lateral arms 9$^B$ having holes 22 through which the posts 23 pass. The longitudinal bar 9$^B$ and the lateral arms 9$^A$ are formed on their upper sides with integral strengthening ribs A and B respectively.

In this arrangement, the springs 14 and 15 are dispensed with, and only the coil springs 24$^A$ are employed to hold the presser plate 10 under pressure. The four springs exert a uniform resilient pressure upon the plate 10, by which the ham is evenly pressed over its entire surface, and therefore uniformly cooked, and this arrangement is particularly adapted to the cooking of small hams.

The mold shown in Fig. 4 is provided with an integral bottom, but I may also use a removable bottom if desired.

The operation of my whole raw ham pressing mold is as follows:—After the removable bottom has been placed in the mold, a raw ham is placed in it, and the two pressure plates which are secured together are placed on top of the ham, and the mold with the lower pressure plate bearing directly on top of the raw ham; then the operator places his hands on the opposite ends of the upper pressure plate and over its spring or solid bar as the case may be, and presses the upper plate against the top of the coiled springs on the corner post of the ham pressing plate below it, and as he presses down on the upper plate he compresses the coiled springs on the four corner posts of the ham pressing plate, which moves up through the apertures in the four corners of the upper plate, as the upper plate is pressed down on them, and as these four coiled springs are pressed down by manual pressure on the upper plate, a resilient pressure is exerted by the ham pressing plate which is exerted against the raw ham and presses it down in the mold. And when the upper plate has been pressed down as far as possible, the operator moves the pawls into the teeth on the opposite ends of the mold and locks the upper plate in its full pressed down position to the mold; then the ham pressing plate is under a downward resilient pressure of its own against the raw ham and then the mold with a ham enclosed, is placed in the cooking vat and as the ham is being cooked, it is softened by the heat of the water and the steam and under this continuous resilient pressure of the four springs, the ham pressing plate further presses the ham until it is satisfactorily cooked.

The mold is then removed, and when cool enough to handle, the upper pressure plate is unlocked from the ratchet teeth of the mold to release the ham pressing plate and permit its removal, after which, the cooked ham is removed from the mold.

In Fig. 4, the strengthening rib A of the bar $9^A$, if formed at each end with an upwardly curved projection or abutment, $A^1$, and when a lever is used to exert pressure on the bar $9^A$, it will bear against these projections, as each end of the bar is pressed down, and they will prevent the bar from slipping off the end of the rib A.

My whole ham pressing mold provides a light weight, easily and quickly handled and thoroughly practical mold, and while I have illustrated and described the preferred construction of it, I do not wish to be limited to the construction and the arrangement shown, as changes may be made in it without departing from the spirit of my invention.

Having described my invention what I claim as new and desire to secure by Letters Patent is:—

The combination with a mold and a presser plate therein having upright studs and coil springs on said studs; of a supporting plate having openings through which said studs pass, said plate resting upon said coil springs, a horizontally disposed blade spring supported on said latter plate and extending beyond the ends of said mold, depending links on the ends of said spring, and means to detachably connect the ends of the link with the ends of the mold.

In testimony whereof I affix my signature.

JOSEPH J. HOFFMANN.